Patented Apr. 17, 1923.

1,452,086

UNITED STATES PATENT OFFICE.

FRANCIS GEORGE MARIES, OF KINGSTON-ON-THAMES, ENGLAND.

PROCESS FOR THE MANUFACTURE OF SOLID PLASTIC MATERIAL FROM CASEIN.

No Drawing.    Application filed October 31, 1921.   Serial No. 511,778.

*To all whom it may concern:*

Be it known that I, FRANCIS GEORGE MARIES, subject of the King of Great Britain, residing at Kingston-on-Thames, England, have invented a new and useful Process for the Manufacture of Solid Plastic Material from Casein; and I do hereby declare the following to be a full, clear, and exact description of the invention, such as will enable others skilled in the art to which it appertains to make and use the same.

This invention relates to the manufacture of solid plastic materials from casein or milk curd.

In the process as usually employed the casein is made into a paste by mixing the same with cold water, with the admixture of colouring matter if required, and then brought to the full boiling point (100° C.) and kept at the boiling point from five to ten minutes the mixture being strained at the same time until the material reaches a pulpy state when it is subjected to a pressure of at least five kilograms per square centimetre in previously heated moulds and then immersed in formalin for a lengthy period such as three, four or more days.

According to a further known process curdled or coagulated milk or casein is placed in a bath consisting of water with an addition of glycerine to prevent too rapid subsequent drying. The whole is then heated to about 90° Celsius so as to form a paste to which the desired colouring matter may be added. After completely drying the material and shaping the same into articles desired the same are immersed in a bath consisting of acetic acid and formic aldehyde in a watery 40% solution.

When it is desired to produce the products, consisting of the above material, by means of compression or moulding the latter operation is effected in moulds heated to about 140° to 150° Celsius after which the articles are sometimes immersed in a bath of fatty acids, aldehyde and spirits of turpentine so as to render the same insoluble.

The material thus produced according to both the above processes is however of a very brittle nature and unless very great care is taken the process has a tendency to spoil the brilliancy of the colours by overheating.

It is therefore the object of the present invention to overcome both of these defects by the provision of an improved process of manufacture whereby the resultant material is pliable and the original brightness of the colouring matter is retained.

The invention consists broadly of a process according to which the casein is firstly:— soaked in a solution containing glycerine, the two being then heated to not more than 175° F., secondly:—subjected to pressure in moulds without heat and thirdly:—soaked in a solution composed of formaldehyde, glycerine, calcium chloride, acetone and water.

In carrying the above process into effect a predetermined quantity of casein is soaked for twelve hours in one-eighth (⅛) of its weight of glycerine mixed with four times the casein's weight of water. These ingredients are then heated together in a jacketed pan at a temperature of not more than 175° F. until a tough india-rubber like mass is obtained. The colouring matter, in the form of aniline dye or dry colours mixed with water, is put in with the material in the jacketed pan just before the particles of casein begin to adhere together.

If a mixture of two or more colours is required, the material containing each particular colour is prepared in separate jacketed pans until the rubber like stage is attained when the separate masses are combined and pulled together until sufficiently incorporated. Veined effects may be obtained by the use of metallic powders mixed with suitable colours.

The resultant coloured or other mass is then subjected to pressure in moulds for about one and a half hours but without heat. The use of pressure without heat is one of the essential features of the process according to this invention and must never be departed from.

This subjection to pressure is effected in two operations, the first operation having as its object to express the remaining water from the material and the second operation to mould such previously pressed material into the shape and thickness desired such for example as sheets, tubes or bars.

The moulded articles are then allowed to dry naturally i. e. without the use of artificial means such as heat the period being from three to four days, after which the articles are again soaked in a solution composed of:—formaldehyde, glycerine, calcium chloride, acetone, water in the following approximate proportions:—

30 parts by weight of formaldehyde (40%),
10 parts by weight of glycerine,
3 parts by weight of calcium chloride,
1 part by weight of acetone,
45 parts by weight of water.

The articles are allowed to soak in the above solution for from 1 to 4 days according to thickness, when they are taken out, drained, and dried naturally by air with occasional subjection to pressure to preserve the desired shape.

This natural drying is carried out over a period of from two to six months after which the articles or material is ready for cutting by sawing, turning, drilling or other machining operations for the production of buttons, combs, knife handles, insulators for electric current and other articles.

I wish it to be understood that the proportions of the ingredients of the above mentioned solutions are only approximate as such proportions are determined to a certain extent by the nature of the finished article or articles.

If desired the acetone may be omitted as not being essential to success but it is advisable to retain the same as by its employment better results are obtainable.

Having now particularly described and ascertained the nature of my said invention and in what manner the same is to be performed I declare that what I claim is:—

1. A process for the manufacture of solid plastic material from casein or milk curd according to which the casein is firstly soaked in a solution containing glycerine, the two being then heated to not more than 175° F., secondly subjected to pressure without heat and thirdly soaked in a solution comprising formaldehyde, glycerine, calcium chloride, and water.

2. A process for the manufacture of solid plastic materials from casein or milk curd according to which the casein is soaked for twelve hours in a solution composed of one-eighth of the casein's weight of glycerine mixed with four times its weight of water, the resultant mass being then heated in jacketed pans to a temperature not exceeding 175° F., then subjected to pressure without heat and finally soaked for from one to four days in a solution composed of 30 parts by weight of formaldehyde (40%), to 10 parts by weight of glycerine, 3 parts by weight of calcium chloride, 1 part by weight of acetone, and 45 parts by weight of water.

3. The process of manufacturing solid plastic material from casein or milk curd consisting firstly in soaking the casein in a solution containing glycerine, then heating the solution with the casein therein to dry the same then subjecting the mixture to pressure to shape the same, and then soaking the pressed mixture to a solution composed of formaldehyde, glycerine, calcium chloride, water, and acetone.

4. The process of manufacturing solid plastic material from casein or milk curd consisting first in soaking the casein in a solution containing glycerine, then drying the solution with the casein therein, then subjecting the mixture to pressure to shape the same, and then soaking the pressed mixture to a solution comprising formaldehyde, glycerine, calcium chloride and water.

In witness whereof I have signed this specification in the presence of two witnesses.

FRANCIS GEORGE MARIES.

Witnesses:
 GEORGE HUGHES,
 K. WELCH.